United States Patent [19]

Kurata

[11] 3,914,716

[45] Oct. 21, 1975

[54] TONE CONTROL CIRCUIT

[75] Inventor: Hirotaka Kurata, Tokyo, Japan

[73] Assignee: Sansui Electric Co., Ltd., Tokyo, Japan

[22] Filed: Oct. 21, 1974

[21] Appl. No.: 516,288

[30] Foreign Application Priority Data

Oct. 26, 1973 Japan ............................ 48-124174

[52] U.S. Cl................. 333/28 T; 179/1 D; 330/107

[51] Int. Cl.$^2$ ........................................... H03G 5/12

[58] Field of Search... 333/28 T; 179/1 D, 100.1 TC

[56] References Cited

UNITED STATES PATENTS 3,732,373 5/1973 Boyden .............................. 179/1 D

*Primary Examiner*—Paul L. Gensler

*Attorney, Agent, or Firm*—Harris, Kern, Wallen & Tinsley

[57] ABSTRACT

A tone control circuit, wherein variable resistors for controlling low-, middle- and high-frequency tones are each connected at one end to the input terminal of said control circuit and at the other end to the output terminal of said control circuit to which the output terminal of an amplifier is connected; the sliding member of the low-frequency tone-controlling variable resistor is connected to the input terminal of the amplifier through a resistor and also to the output terminal of said amplifier through a resistor, capacitor and resistor in turn and further to the input terminal of the control circuit through the resistor and capacitor; the sliding member of the middle-frequency tone-controlling variable resistor is connected to the input terminal of the amplifier through a capacitor and resistor; and the sliding member of the high-frequency tone-controlling variable resistor is connected to the input terminal of the amplifier through a capacitor.

3 Claims, 4 Drawing Figures

TONE CONTROL CIRCUIT

BACKGROUND OF THE INVENTION

This invention relates to a tone control circuit, and more particularly to a tone control circuit so improved as to prevent high-frequency tones from being affected when middle-frequency tones are controlled.

With the prior art tone control circuit, the variable resistors $VR_1$, $VR_2$, $VR_3$ for controlling low-, middle- and high-frequency tones are each connected, as shown in FIG. 1, at one end to the input terminal $t_i$ of said circuit through resistors $R_1$, $R_3$, $R_5$ respectively and at the other end to the output terminal $t_o$ of said circuit through resistors $R_2$, $R_4$, $R_6$. Both ends of the variable resistor $VR_1$ are connected to the corresponding sliding member through capacitors $C_2$, $C_3$ respectively. Said sliding member is connected to the input terminal of the amplifier AMP through a resistor $R_7$. A capacitor $C_1$ is connected between both ends of the variable resistor $VR_2$. The sliding members of the variable resistors $VR_2$, $VR_3$ are connected to one end of a capacitor $C_5$ through the corresponding resistor $R_8$ and capacitor $C_4$. The other end of said capacitor $C_5$ is connected to the input terminal of the amplifier AMP.

With the prior art tone control circuit of FIG. 1, the capacitors $C_1$, $C_4$ have a very small reactance relative to the high frequency, and is regarded as forming the circuit of FIG. 2 with respect to said frequency. Referring to FIG. 2, when the sliding member of the variable resistor $VR_3$ is positioned at point *a*, the greater part of input current is supplied to the amplifier AMP through the resistor $R_5$ and capacitor $C_4$, and most of the feedback current is brought back to said amplifier AMP through the resistor $R_4$, variable resistor $VR_2$ and resistor $R_8$ in turn. When, therefore, the capacitor $C_4$ decreases in reactance with an increase in frequency, a larger amount of input current is introduced, whereas the feedback current is maintained at a prescribed amount, thus causing the tone control circuit to raise the high frequency tones. Where, under this condition, the sliding member of the middle-frequency tone controlling variable resistor $VR_2$ is shifted, the feedback current varies in amount, thus changing the high-frequency tones. When the sliding member of the high-frequency tone-controlling variable resistor $VR_3$ is brought to point *b*, then most of the input current is delivered to the amplifier AMP through the resistor $R_3$, variable resistor $VR_2$ and resistor $R_8$ in turn, while the feedback current is returned to the amplifier AMP through the resistor $R_6$ and capacitor $C_4$. With the prior art tone control circuit, therefore, the raised frequency only leads to an increase in the amount of feedback current, causing the tone control circuit eventually to decrease the high-frequency. In this case, too, the movement of the sliding member of the variable resistor $VR_2$ varies the high-frequency tones.

As apparent from the foregoing description, the prior art tone control circuit has the drawback that the varied resistance of the middle-frequency tone-controlling variable resistor $VR_2$ changes the high-frequency tones.

SUMMARY OF THE INVENTION

It is accordingly the object of this invention to provide a tone control circuit wherein the middle-frequency tone-controlling resistor can be operated without changing the high-frequency tone.

According to an aspect of this invention, there is provided a tone control circuit, wherein variable resistors for controlling low-, middle- and high-frequency tones are each connected at one end to the input terminal of said control circuit and at the other end to the output terminal of said control circuit. The sliding member of a low-frequency tone-controlling variable resistor is connected to the input terminal of an amplifier through a first resistor and also to a second resistor, which in turn is connected to first and second capacitors connected to both terminals of a middle-frequency tone-controlling variable resistor. The sliding member of the middle-frequency tone-controlling variable resistor is connected to the input terminal of the amplifier through a third resistor. The sliding member of a high-frequency tone-controlling variable resistor is connected to the input terminal of the amplifier through a third capacitor.

DETAILED DESCRIPTION OF THE INVENTION

Figure 1:
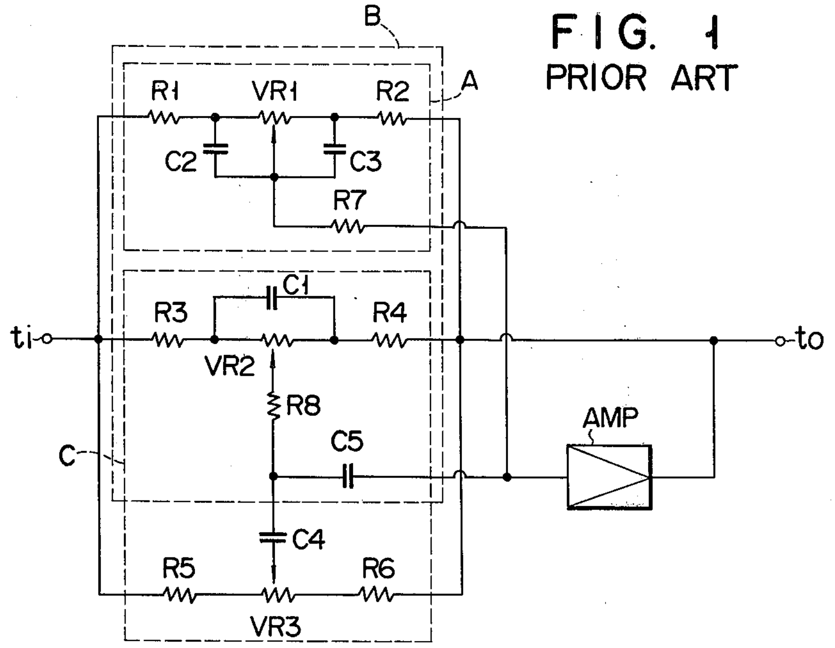
FIG. 1 PRIOR ART
FIG. 1 is a diagram of the prior art tone control circuit.
Figure 2:
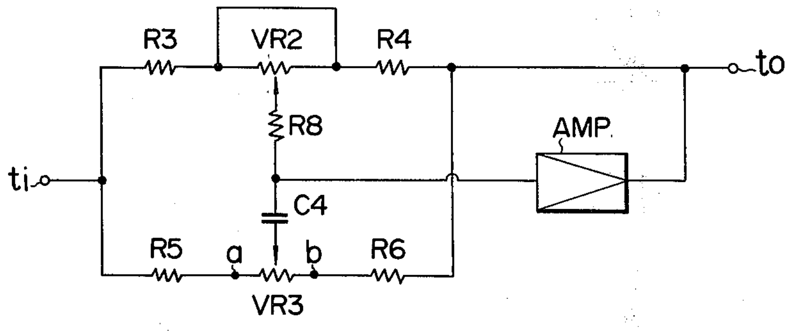
FIG. 2 PRIOR ART
FIG. 2 is an equivalent circuit diagram of FIG. 1 relative to high frequency.
Figure 3:
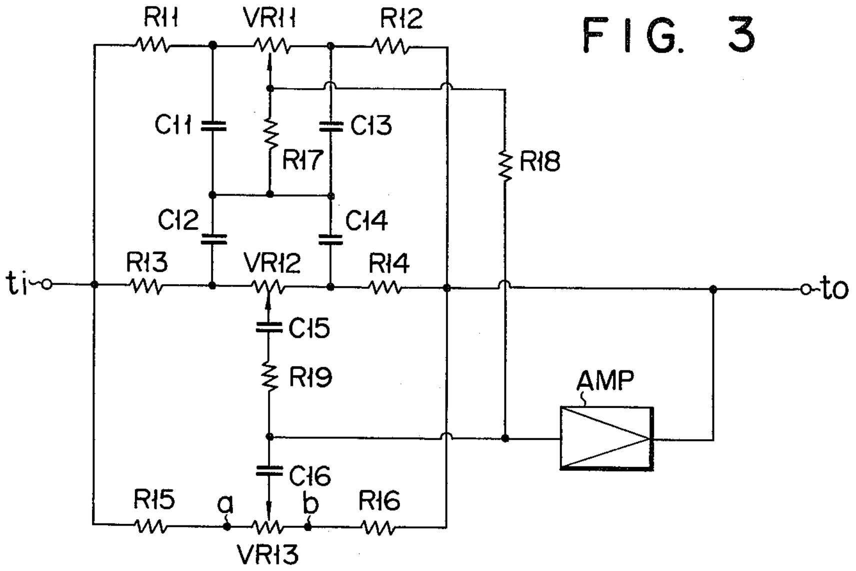
FIG. 3 is a diagram of a tone control circuit according to an embodiment of this invention.

Referring to the first embodiment of FIG. 3, a low-frequency tone-controlling variable resistor $VR_{11}$ is connected at one end to the input terminal $t_i$ of said control circuit through a resistor $R_{11}$ and at the other end to the output terminal $t_o$ of said control circuit through a resistor $R_{12}$. A middle-frequency tone-controlling variable resistor $VR_{12}$ is connected at one end to the input terminal $t_i$ of said control circuit through a resistor $R_{13}$ and at the other end to the output terminal of said control circuit through a resistor $R_{14}$. A high-frequency tone-controlling variable resistor $VR_{13}$ is connected at one end to the input terminal $t_i$ of said control circuit through a resistor $R_{15}$ and at the other end to the output terminal $t_o$ of said control circuit through a resistor $R_{16}$. One terminal of the variable resistor $VR_{11}$ is connected to the corresponding terminal of the variable resistor $VR_{12}$ through series connected capacitors $C_{11}$, $C_{12}$ and the opposite terminal of said variable resistor $VR_{11}$ is connected to the corresponding terminal of said variable resistor $VR_{12}$ through series connected capacitors $C_{13}$, $C_{14}$. A line connecting the junction of the capacitors $C_{11}$, $C_{12}$ and that of the capacitors $C_{13}$, $C_{14}$ is connected to the sliding member of the variable resistor $VR_{11}$ through a resistor $R_{17}$. Said sliding member is connected to the input terminal of the amplifier AMP through a resistor $R_{18}$. The sliding member of the variable resistor $VR_{12}$ is connected to the input terminal of the amplifier AMP through series connected capacitor 15 and resistor $R_{19}$. The sliding member of the variable resistor $VR_{13}$ is connected to the input terminal of the amplifier AMP, through a capacitor $C_{16}$. The output terminal of said amplifier AMP is connected to the output terminal $t_o$ of the control circuit.

There will now be described the operation of the tone control circuit arranged as described above according to the embodiment of FIG. 3. The capacitors $C_{11}$, $C_{12}$, $C_{13}$, $C_{14}$, $C_{15}$ are chosen to have such a capacity as makes their reactance very small relative to the high-frequency. When, therefore, the sliding member of the high-frequency tone-controlling variable resistor $VR_{13}$ is positioned at point a, then most of the input current having the high frequency is supplied to the input terminal of the amplifier AMP through the resistor $R_{15}$ and capacitor $C_{16}$. The greater part of current initially delivered from the amplifier AMP is fed back thereto through the resistor $R_{14}$, capacitor $C_{14}$, resistor $R_{17}$ and resistor $R_{18}$ in turn. In this case, a very small amount of current is fed back to the amplifier AMP through the resistor $R_{14}$, variable resistor $VR_{12}$, capacitor $C_{15}$ and resistor $R_{19}$ in turn. Accordingly, the shifting of the sliding member of the variable resistor $VR_{12}$ gives rise to litttle change in the amount of feedback current, substantially saving the increasing characteristics of the high-frequency tone from the effect of the operation of the middle frequency tone-controlling variable resistor $VR_{12}$.

When the sliding member of the high-frequency tone-controlling variable resistor $VR_{13}$ is brought to point b, most of the input current having the high frequency is supplied to the amplifier AMP through the resistor $R_{13}$, capacitor $C_{12}$ and resistors $R_{17}$, $R_{18}$ in turn. The greater part of current initially delivered from the amplifier AMP is fed back thereto through the resistor $R_{16}$ and capacitor $C_{16}$. Therefore, only a very small amount of current passes through the variable resistor $VR_{12}$, capacitor $C_{15}$ and resistor $R_{19}$ in turn, giving rise to little change in the input current even when the sliding member of said variable resistor $VR_{12}$ is shifted. As the result, the operation of the middle-frequency tone-controlling variable resistor $VR_{12}$ little affects the decreasing characteristics of the high-frequency tone.

As apparent from the foregoing description, the tone control circuit of this invention substantially prevents the high-frequency tone from being disturbed by the operation of the middle-frequency tone-controlling variable resistor $VR_{12}$. Accordingly, where the high-frequency tone-controlling resistor is adjusted to have desired increasing and decreasing characteristics of the high-frequency tones and then the middle-frequency tone-controlling resistor is adjusted, the necessity of controlling the high tone frequency for a second time is eliminated since the high-frequency tone characteristics are little affected due to the adjusting operation of the middle-frequency tone-controlling resistor.

Figure 4:
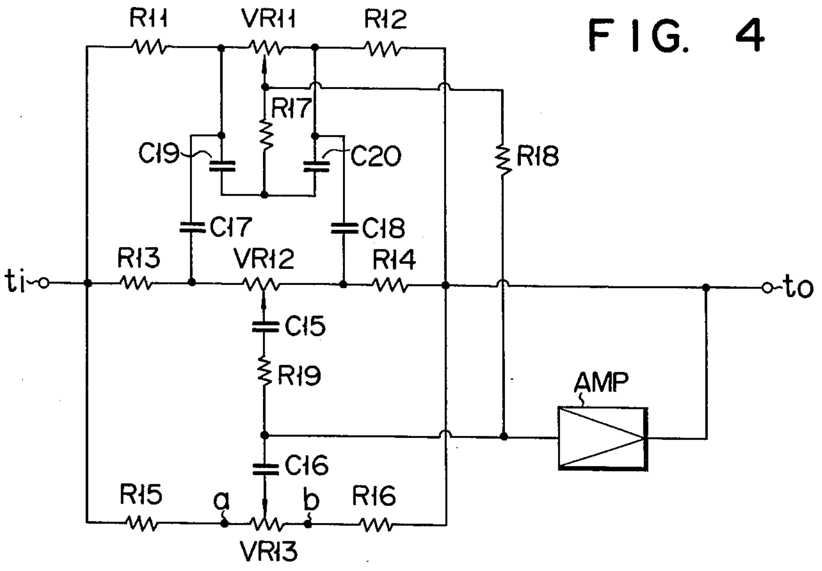
FIG. 4 is a diagram of a tone control circuit according to another embodiment of the invention.

There will now be described the operation of a tone control circuit according to the second embodiment of FIG. 4. When the sliding member of the high-frequency tone-controlling variable resistor $VR_{13}$ is positioned at point a, the greater part of current initially delivered from the amplifier AMP is fed back thereto through the resistor $R_{14}$, capacitor $C_{18}$, capacitor $C_{20}$, and resistors $R_{17}$, $R_{18}$ in turn. When the sliding member of the high-frequency tone-controlling variable resistor $VR_{13}$ is brought to point b, then most of the input current is delivered to the amplifier AMP through the resistor $R_{13}$, capacitors $C_{17}$, $C_{19}$ and resistors $R_{17}$, $R_{18}$ in turn. The greater part pf current initially supplied by the amplifier AMP is fed back thereto through the resistor $R_{16}$ and capacitor $C_{16}$. The second embodiment of the above-mentioned circuit arrangement attains the same effect as the first embodiment.

As mentioned above, the tone control circuit of this invention has such an arrangement as substantially prevents the input current and feedback current reproducing high-frequency tones from being conducted through the middle-frequency tone-controlling variable resistor, thereby little changing the high-frequency tones when the middle-frequency tone-controlling resistor is controlled.

What is claimed is:

1. A tone control circuit, wherein low-, middle- and high-frequency tone-controlling variable resistors are each connected at one end to the input terminal of said control circuit and at the other end to the output terminal of said control circuit; the low-frequency tone-controlling variable resistor has a sliding member which is connected through a first resistor to the input terminal of an amplifier whose output terminal is connected to the output terminal of said control circuit and which sliding member is also connected to one terminal of a second resistor, the opposite terminal of which is connected to both terminals of the middle-frequency tone-controlling variable resistor through first and second capacitors respectively; the sliding member of said middle-frequency tone-controlling variable resistor is connected to the input terminal of the amplifier through a third capacitor and a third resistor; and the sliding member of the high-frequency tone-controlling variable resistor is connected to the input terminal of the amplifier through a fourth capacitor.

2. A tone control circuit, wherein low-, middle- and high-frequency tone-controlling variable resistors are each connected at one end to the input terminal of said control circuit and at the other end to the output terminal of said control circuit; the low-frequency tone-controlling variable resistor has a sliding member which is connected through a first resistor to the input terminal of an amplifier whose output terminal is connected to the output terminal of said control circuit and which sliding member is also connected to one terminal of a second resistor, the opposite terminal of the second resistor is connected to both terminals of the low-frequency tone-controlling variable resistor through first and second capacitors respectively and also to both terminals of the middle-frequency tone-controlling variable resistor through third and fourth capacitors respectively; the sliding member of the middle-frequency tone-controlling variable resistor is connected to the input terminal of the amplifier through a fifth capacitor and a third resistor; and the sliding member of the high-frequency tone-controlling variable resistor is connected to the input terminal of the amplifier through a sixth capacitor.

3. A tone control circuit, wherein low-, middle- and high-frequency tone-controlling variable resistors are each connected at one end to the input terminal of said control circuit and at the other end to the output terminal of said control circuit; the low-frequency tone-controlling variable resistor has a sliding member which is connected through a first resistor to the input terminal of an amplifier whose output terminal is connected to the output terminal of said control circuit, and which sliding member is also connected to one terminal of a second resistor, the opposite terminal of which is connected to both terminals of the low-frequency tone-controlling variable resistor through first and second capacitors respectively; the middle-frequency tone-controlling variable resistor is connected at one end to the opposite terminal of the second resistor through a third capacitor and said first capacitor, and at the other end to said opposite terminal of the second resistor through a fourth capacitor and said second capacitor and is provided with a sliding member which is connected to the input terminal of the amplifier through a fifth capacitor and a third resistor; and the high-frequency tone-controlling variable resistor has a sliding member which is connected to the input terminal of the amplifier through a sixth capacitor.

* * * * *